United States Patent [19]

Rey

[11] 4,430,248

[45] Feb. 7, 1984

[54] CATIONIC POLYMERS FOR REDUCTION OF VISCOSITY OF A MAGNESIUM HYDROXIDE SLURRY

[75] Inventor: Paul R. Rey, Coraopolis, Pa.

[73] Assignee: Calgon Corporation, Pittsburgh, Pa.

[21] Appl. No.: 303,305

[22] Filed: Sep. 17, 1981

Related U.S. Application Data

[63] Continuation-in-part of Ser. No. 271,469, Jun. 8, 1981, abandoned.

[51] Int. Cl.$^3$ ................... B01J 13/00; F17D 1/16; F17D 1/18
[52] U.S. Cl. ................... 252/313 R; 406/49; 252/310; 137/13; 106/306
[58] Field of Search ............ 252/313 R, 310, 8.5 A; 106/300, 193 R; 137/13; 406/49

[56] References Cited

U.S. PATENT DOCUMENTS

| | | | |
|---|---|---|---|
| 3,948,783 | 4/1976 | Szabo et al. | 252/8.55 D |
| 4,227,934 | 10/1980 | Lawhorne | 106/300 |
| 4,230,610 | 10/1980 | Falcione et al. | 260/29.6 |

*Primary Examiner*—Richard D. Lovering
*Assistant Examiner*—Catherine S. Kilby
*Attorney, Agent, or Firm*—Michael C. Sudol; R. Brent Olson

[57] ABSTRACT

The instant invention is directed to a method for reducing the viscosity of magnesium hydroxide aqueous slurries which comprises adding an effective amount of a cationic polymer to the magnesium hydroxide slurry. The instant invention is also directed to magnesium hydroxide aqueous slurries containing cationic polymer.

6 Claims, No Drawings

CATIONIC POLYMERS FOR REDUCTION OF VISCOSITY OF A MAGNESIUM HYDROXIDE SLURRY

BACKGROUND OF THE INVENTION

This application is a continuation-in-part of application Ser. No. 271,469, filed June 8, 1981, now abandoned.

This invention relates to the use of cationic polymers to reduce the viscosity of a magnesium hydroxide slurry and to the magnesium hydroxide slurry containing cationic polymer.

Magnesia (MgO) which is used in the manufacture of refractory materials is derived from three basic sources: seawater, well brines and magnesite (ore). The processed material is in the form of a magnesium hydroxide slurry [Mg(OH)$_2$] before being "dead-burned" to produce the magnesia. Transportation problems can occur with the higher solids slurries. A reduction of slurry viscosity is important because it allows a more concentrated slurry to be transported with a savings in energy while providing a higher feed solids to the final filtering process, which can also result in a substantial energy savings. Thus, an agent which permits the use of higher solids slurries, i.e. less water, is of substantial value.

The viscosity was previously reduced by injection of steam or the addition of water. Since the primary function of the process is to produce a dry concentrate, addition of water to the slurry is counter-productive.

It is known to use neutralized polyacrylic acid to reduce the viscosity of magnesium oxide aqueous slurries (U.S. Pat. No. 4,230,610). However, this process suffers from the disadvantage that it is only effective at very large concentrations.

It is an object of the instant invention to reduce the viscosity of magnesium hydroxide slurries in a less energy-costly manner and with the possibility of using the additive in very small concentrations.

DESCRIPTION OF THE INVENTION

The instant invention is directed to a method for reducing the viscosity of magnesium hydroxide aqueous slurries which comprises adding an effective amount of a cationic polymer to the slurry.

The instant invention is also directed to the magnesium hydroxide aqueous slurry containing cationic polymer.

The magnesium hydroxide slurry is generally made up to about 20 to 60 percent magnesium hydroxide and 80 to 40 percent water.

Any cationic polymer may be used. Examples include polymers of methacryloyloxyethyl trimethyl ammonium methosulfate (METAMS), vinyl benzyl trimethyl ammonium chloride (VBTAC), dimethyldiallyl-ammonium chloride (DMDAAC) and 3-acrylamido-3-methyl butyl trimethyl ammonium chloride (AMB-TAC). The preferred cationic polymers are those with a molecular weight in the range 20,000 to 5,000,000, as determined by gel permeation. The most preferred cationic polymers are the homopolymers of DMDAAC.

Generally, the higher the molecular weight, the higher the concentration necessary. Copolymers also generally require a higher concentration than homopolymers to obtain a similar reduction in viscosity.

Copolymers of cationic monomer and non-ionic monomer (preferably less than 50 mole percent non-ionic component) may also be used. The preferred non-ionic monomer is acrylamide.

The dosage of cationic polymer used is dependent solely on economics. From an economic standpoint, it is preferred to use 5 pounds/ton or less. The most preferred dosage range is from 0.04 to 2 pounds/ton.

A flocculant, preferably a polyacrylamide, may optionally be added to the thickener feed as a settling aid for efficient solid/liquid separation.

EXAMPLES

Well brine was pumped into a vat where it was reacted with dolomitic lime. The magnesium hydroxide, which precipitated out, was settled in thickeners (settling tanks). Five ppm polyacrylamide flocculant, having a molecular weight of about 10,000,000, was used as a settling aid for efficient solid/liquid separation. The underflow was pumped at about 25 percent solids to a drum filter where it was filtered and washed to remove excess chlorides. The temperature of the process stream at this point was between 100° and 130° F. The drum filter discharge, which was about 54 percent solids, was diluted to approximately 45 percent solids to improve the pumping characteristics of the slurry. Polymer treatment was investigated on 300 gram samples of the drum filter discharge, as summarized in the Table. The viscosity of each magnesium hydroxide slurry was measured with a Brookfield viscometer at a spindle speed of 30 rpm.

TABLE I

| | | Temperature | 70° F. | | |
| | | pH | 10.5 | | |
| | | Percent Solids | 54 | | |

| Example | Polymer | Approximate Molecular Weight | Intrinsic Viscosity (dl/g) | Pounds Active/ Ton | Slurry Viscosity (cps) |
|---|---|---|---|---|---|
| 1 | DMDAAC[1] | 40,000 | 0.27 | 0 | 370 |
| 2 | | | | 0.04 | 116 |
| 3 | | | | 0.08 | 68 |
| 4 | | | | 0.25 | 51 |
| 5 | | | | 0.42 | 41 |
| 6 | | | | 0.83 | 22 |
| 7 | DMDAAC | 120,000 | 0.62 | 0 | 363 |
| 8 | | | | 0.04 | 189 |
| 9 | | | | 0.08 | 74 |
| 10 | | | | 0.25 | 53 |
| 11 | | | | 0.42 | 40 |
| 12 | | | | 0.83 | 31 |
| 13 | DMDAAC | 2,000,000 | 1.6 | 0 | 370 |
| 14 | | | | 0.04 | 240 |
| 15 | | | | 0.08 | 110 |
| 16 | | | | 0.25 | 50 |
| 17 | | | | 0.42 | 41 |
| 18 | | | | 0.83 | 29 |
| 19 | DMDAAC | 80,000 | 0.47 | 0 | 350 |
| 20 | | | | 0.04 | 118 |
| 21 | | | | 0.08 | 63 |
| 22 | | | | 0.25 | 45 |
| 23 | | | | 0.42 | 38 |
| 24 | | | | 0.83 | 28 |
| 25 | DMDAAC | 300,000 | 0.96 | 0 | 370 |
| 26 | | | | 0.04 | 188 |
| 27 | | | | 0.08 | 72 |
| 28 | | | | 0.25 | 46 |
| 29 | | | | 0.42 | 36 |
| 30 | | | | 0.83 | 28 |
| 31 | 75% DMDAAC/ 25% AM[2] | 4,000,000 | 5.0 | 0 | 340 |
| 32 | | | | 0.04 | 740 |
| 33 | | | | 0.08 | 780 |
| 34 | | | | 0.25 | 260 |
| 35 | | | | 0.42 | 125 |
| 36 | | | | 0.83 | 48 |
| 37 | 95% DMDAAC/ | — | — | 0 | 345 |
| 38 | | | | 0.04 | 315 |

TABLE I-continued

| | | Temperature | 70° F. | | |
| | | pH | 10.5 | | |
| | | Percent Solids | 54 | | |
| Example | Polymer | Approximate Molecular Weight | Intrinsic Viscosity (dl/g) | Pounds Active/Ton | Slurry Viscosity (cps) |
|---|---|---|---|---|---|
| 39 | 5% AM | | | 0.08 | 135 |
| 40 | | | | 0.25 | 50 |
| 41 | | | | 0.42 | 39 |
| 42 | | | | 0.83 | 31 |
| 43 | DMDAAC | 10,000 | 0.08 | 0 | 345 |
| 44 | | | | 0.04 | 121 |
| 45 | | | | 0.08 | 80 |
| 46 | | | | 0.25 | 51 |
| 47 | | | | 0.42 | 41 |
| 48 | | | | 0.83 | 30 |
| 49 | METAMS[3] | 70,000 | — | 0 | 335 |
| 50 | | | | 0.02 | 755 |
| 51 | | | | 0.05 | 245 |
| 52 | | | | 0.16 | 110 |
| 53 | | | | 0.27 | 60 |
| 54 | | | | 0.54 | 45 |

[1]DMDAAC = dimethyldiallylammonium chloride
[2]AM = acrylamide
[3]METAMS = methacryloyloxyethyl trimethyl ammonium methosulfate

I claim:

1. A method for reducing the viscosity of a magnesium hydroxide aqueous slurry which comprises adding 5 pounds/ton or less of a cationic polymer selected from the group consisting of methacryloyloxyethyl trimethyl ammonium methosulfate, vinyl benzyl trimethyl ammonium chloride, dimethyldiallyl ammonium chloride and 3-acrylamido-3-methyl butyl trimethyl ammonium chloride, to the magnesium hydroxide slurry.

2. The method of claim 1, wherein said cationic polymer is a homopolymer having a molecular weight in the range 20,000 to 5,000,000.

3. The method of claim 2, wherein said cationic polymer is poly(dimethyldiallyl ammonium chloride).

4. The method of claim 1, wherein said cationic polymer is used in a range of from 0.04 to 2 pounds/ton.

5. The method of claim 1, wherein said magnesium hydroxide aqueous slurry comprises 20 to 60 percent magnesium hydroxide and 80 to 40 percent water.

6. The product produced by the method of claim 1.

* * * * *